(No Model.)
J. W. PARKS & P. G. ROQUEMORE.
NUT LOCK.
No. 374,426. Patented Dec. 6, 1887.
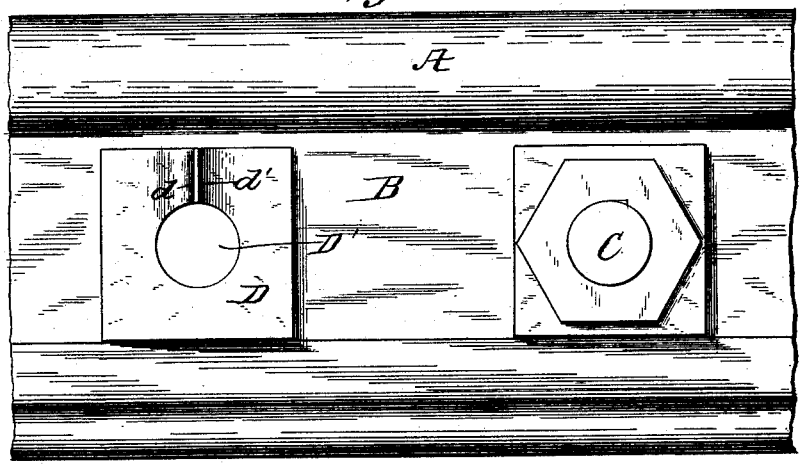
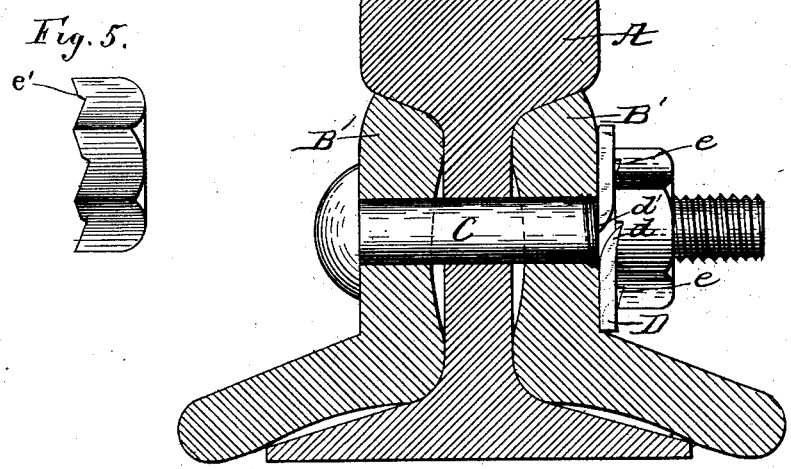
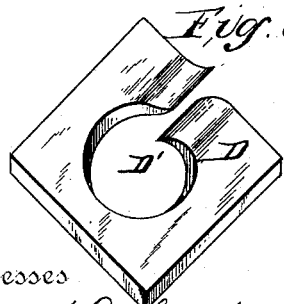
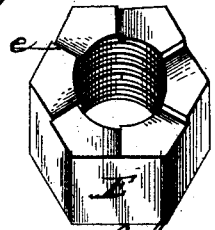
Witnesses
Wm. H. Scott
Chas. M. Werle
Inventors
John W. Parks
Peter G. Roquemore
By their Attorney

UNITED STATES PATENT OFFICE.

JOHN W. PARKS AND PETER G. ROQUEMORE, OF MARSHALL, TEXAS.

NUT-LOCK.

SPECIFICATION forming part of Letters Patent No. 374,426, dated December 6, 1887.

Application filed June 16, 1887. Serial No. 241,545. (No model.)

*To all whom it may concern:*

Be it known that we, JOHN W. PARKS and PETER G. ROQUEMORE, of Marshall, in the county of Harrison and State of Texas, have invented certain new and useful Improvements in Nut-Locks; and we do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to an improved nut-lock which is cheap, simple, and effective, however heavy and frequent the strain and concussion on the parts to which it is applied.

The object of the invention is to produce a nut-lock which will require a minimum number of parts to adjust, will require no other tools than a wrench, which will stay where adjusted in spite of any amount of pounding or concussion, and which, when desired, may be removed without difficulty.

To this end our invention consists in a nut provided with a serrated face and a washer having sharp spring-lips engaging with the serrations.

Our invention also consists in a peculiarly-constructed washer for locking the nut, the novel features of which will be pointed out in the claims.

In the drawings accompanying this specification, Figure 1 is a side elevation of our invention as applied to a rail-joint, the nut being removed from the bolt on the left to better show the position of the washer. Fig. 2 is a cross-section of a rail near a joint, showing the angle-bars and the nut-lock in operative position. Fig. 3 is a detail perspective view of improved washer. Fig. 4 is a detail perspective view showing the notched face of the nut. Fig. 5 is a detail view showing a modified form of notches in the engaging-nut face.

The washer D, Figs. 1, 2, and 3, is made of tempered steel, and has a central hole, D', for the bolt. A cut is made in one side of the washer, and the opposite sides are bent in opposite directions and given a sharp edge. The whole may be stamped out from a single piece of sheet metal at one blow by using a properly-shaped die and hammer. The washer is given an irregular contour, a square form answering well for rail-joint uses, and when in place one side bears against the vertex line of the angle-bar and prevents the washer from turning. If a fish-plate is used on the joint, the washer may be made large enough to engage one of the flanges of the rail; or the inner lip, d, of the washer may be depended on to prevent slipping. The engaging face of the nut is notched, either as shown at e in Figs. 2 and 4 or as shown at E' in Fig. 5. In the former the notch has one perpendicular wall and one inclined. In the latter both walls are inclined, as shown in Fig. 5. The form shown in Fig. 5 is more readily removed when necessary, and makes a perfectly safe lock, and is the form we prefer to use in practice.

In putting the parts in position a bolt, C, is thrust through the rail and angle-bars B B', or through any two parts to be bolted together, and the washer D slipped on. It will be observed that it is immaterial which side of the washer faces the nut, and this is a feature of great practical importance, as in many forms of nut-locks an accidental reversal of the washer will not lock the nut, and the latter will be sure to loosen. The nut E is then screwed on the bolt and rides forward on the thread until it engages the projecting lip d of the washer. This slips over the inclined walls of the notches, yielding slightly as the nut is screwed up, and is adjusted so as to leave the lip in the corner of the notch when the operation is finished. The inner lip, d', of the washer bites into the side of the angle-bar B', or, if the parts united be of softer material than iron, takes a firm hold on one of the same.

A practical trial of this lock on a rail-joint subjected to constant use has demonstrated its efficiency where all other tested forms have failed. Whereas the nuts had to be tightened every twenty-four hours in the joints on which the trial was made, ours has been in continuous use for weeks and is as tight now as when first adjusted.

We desire to have it understood that our invention is not limited in its application to rail-joints, but may be adopted on any structure where a reliable adjustment of a nut on a bolt is desired.

Having thus fully described our invention, what we claim, and desire to secure by Letters Patent of the United States, is—

1. In a nut-lock, the combination, with a bolt and a nut having a notched or serrated face, of a rectangular washer split across one of its sides, the ends thus formed being bent in opposite directions to substantially the same degree, and each end being beveled from one side to the other to form a knife-edge, substantially as specified.

2. As a new article of manufacture, a rectangular washer made of tempered steel and having a bolt-hole, one side of the washer being cut through from the edge to the bolt-hole, the ends thus formed being bent in opposite directions to substantially the same degree, and each end being beveled from one side to the other to form a knife-edge, substantially as described.

In testimony that we claim the foregoing as our own we affix our signatures in presence of two witnesses.

JOHN W. PARKS.
P. G. ROQUEMORE.

Witnesses:
J. P. ALFORD,
S. R. PERRY.